United States Patent [19]

Rosenwaks et al.

[11] Patent Number: 4,807,244
[45] Date of Patent: Feb. 21, 1989

[54] CHEMICAL LASER

[76] Inventors: Salman Rosenwaks, P.O. Box 952, Omer 84965; Lawrence A. Levin, 27 Mishol Maale Akrabim, Beer-Sheva; David Chuchem, P.O. Box 299, Omer 84965, all of Israel

[21] Appl. No.: 32,440

[22] Filed: Mar. 30, 1987

[30] Foreign Application Priority Data

Apr. 2, 1986 [IL] Israel ............................. 78405

[51] Int. Cl.[4] ............................................. H01S 3/097
[52] U.S. Cl. ................................. 372/89; 372/77; 372/39; 372/701
[58] Field of Search .............. 372/89, 90, 56, 77, 372/39, 701

[56] References Cited

U.S. PATENT DOCUMENTS

| 3,904,985 | 9/1975 | Robinson et al. | 372/90 |
| 4,087,765 | 5/1978 | Edelstein et al. | 372/57 |
| 4,099,142 | 7/1978 | Hershkowitz et al. | 372/90 |
| 4,249,143 | 2/1981 | Eden | 372/57 |
| 4,334,199 | 6/1982 | Ham | 372/57 |
| 4,414,671 | 11/1983 | Wells, Jr. et al. | 372/68 |
| 4,580,267 | 4/1986 | White | 372/57 |
| 4,627,066 | 12/1986 | Stwalley et al. | 372/57 |
| 4,646,311 | 2/1987 | Nighan et al. | 372/57 |

OTHER PUBLICATIONS

Benson et al., "Gain Measurements in a Transvers—Flowing $N_2$—$N_2O$+CO Chemical Laser"; Chem. Phys. Lett. vol. 35 No. 2 pp. 161–166.

*Primary Examiner*—Léon Scott, Jr.
*Attorney, Agent, or Firm*—Browdy & Neimark

[57] ABSTRACT

There are provided chemical lasers which provide pulsed radiation in the visible or near visible (denoted hereafter as short-wavelength) range. The novel pulsed short-wavelength chemical lasers are operated by detonating an explosive mixture which contains fuel and lasants, the detonation resulting in electronically excited molecules. Lasing can be brought about by energy transfer within such molecules, or by energy transfer from such excited molecules to other molecules or to atoms resulting in the desired short-wavelength laser emission. The lasers can be operated at high pulse energies.

11 Claims, 1 Drawing Sheet

CHEMICAL LASER

FIELD OF THE INVENTION

The invention relates to chemical lasers which provide brief pulses of energy in the region of short wave lengths. The lasing is the result of the explosion of a predetermined quantity of a suitable explosive substance, such as an azide, which results in electronically excited molecules A* and energy transfer from such excited species to suitable atoms or molecules M* which lase by relaxation according to the equation $M^* \rightarrow M + h\nu$, or by lasing from the excited molecule itself by relaxation according to the equation $A^* \rightarrow A + h\nu$.

The lasing is advantageously effected in a suitable device, where there are provided inlet means for the explosive material, where there is provided a reaction cell in which the explosive is detonated, the products flowing via a nozzle to a diffuser section. The flow through the nozzle may be subsonic or supersonic. Lasing takes place in the reaction cell and also in the downstream region.

There is also provided a method of lasing which comprises detonating a suitable explosive, such as a sensitive azide, in a lasing cavity and if desired, repeating such detonations at a desired sequence, resulting in the formation of excited species and lasing from these.

SUMMARY OF THE INVENTION

There are provided pulsed short-wavelength chemical lasers which can be effectively operated at high pulse energies. The novel lasers are operated by detonating premixed fuel lasants, resulting in electronically excited molecules. Lasing results by energy transfer from such excited molecules to other atoms or molecules or within the molecules themselves.

The detonatable fuel mixture comprises either predetermined quantities of solid, liquid or gaseous mixtures or of admixtures of reactants resulting in such explosive mixtures.

The explosive fuel may be for example a certain azide which provides as a result of the explosion excited nitrogen molecules, which are excited to the A state, the lasant being the other component of the azide, such as for example lead in the case of lead azide. The lasant lead atom, Pb, is excited for example to the $^1S_o$ state. In this example, there are provided unit dosage quantities of lead azide $Pb(N_3)_2$, and this has a number of advantages as set out in detail in the following.

The detonation is advantageously effected in a detonation chamber which is connected by a sonic or supersonic nozzle to a laser cavity, there being provided exit means for the spent gases from said laser cavity, which may comprise a diffuser for pressure recovery.

As such solid fuel is detonated, electronically excited energy storage molecules (in this case nitrogen molecules) are produced, together with lasant atoms, in this case lead atoms. Lasing results in a short wave length radiation (e.g. 531 and 462 nm). Other azides producing excited molecules and providing atoms suitable for lasing in the desired wave-length range can be used. There may also be used other compounds or mixtures which can receive the required energy from such excited molecules and which lase in the desired spectral region.

There can also be used reactants which are introduced into the detonation chamber, interact and detonated, providing the same type of excited molecules and atoms or molecules which lase in the desired spectral range.

The detonation technique which provides electronically excited molecules and means of lasing in the short-wavelength range is new and provides a substantial technical advantage over the prior art. The novel technique is characterised by a number of advantageous properties, and amongst these there may be mentioned:

a. The fuel is provided in ready-made state with no need for mixing when a solid is used;

b. Elimination of energy pooling of $N_2(A)$ in the case of azides;

c. Clean reaction products: in the case of lead azide only $N_2$ and Pb, corresponding products with other azides;

d. Supersonic expansion and pressure recovery eliminates the necessity to use pumps;

e. Emission in the short-wavelength region;

f. Capable of producing high energy pulses;

g. High inherent efficiency.

Amongst azides which may be used in chemical lasers of the invention there may be mentioned metal azides of Pb, Cu, Mg, Cd, Al, Bi, Ag, Hg, K, Na, Fe, Mn etc. and azides of CO, NO etc.

The invention is exemplified with reference to lead azide, and it is to be understood that this is by way of example only.

Lead azide, $Pb(N_3)_2$ provides the lasant, the Pb atom excited to the $^1S_o$ state, and the fuel is the $N_2$ molecule, excited to the A state. The kinetics are schematically as follows:

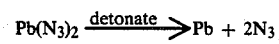

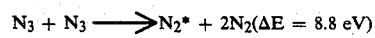

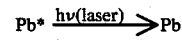

Lead azide is a well known explosive which can be handled safely. It detonates upon (electrical or photolytic) initiation or by mechanical shock to provide lead atoms and $N_3$ radicals. The reaction of the ground state azide radicals:

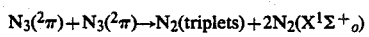

is energetically and spin allowed. The total reaction rate constant is $\sim 10^{-11}$ cm$^3$sec$^{-1}$, and since all triplets end up as $N_2(A)$ each molecule of lead azide produces one $N_2(A)$. The reaction of $N_2(A)$ with a lead atom efficiently produces excited Pb atoms, Pb*, which is primarily $Pb(^1S_o)$. The energy level diagram of the lowest states of lead and nitrogen are given in FIG. 1. The $N_2(A-X)$ transitions have large Franck-Condon factors. The fuel and the lasant originate from the same molecule, and this obviates the necessity of premixing. The reaction sequence favours the fast energy transfer from $N_2(A)$ to Pb, thus preventing the build up of high concentrations of $N_2(A)$, thus largely preventing the detrimental effect of the energy pooling reaction.

The invention is illustrated with reference to the enclosed Figures wherein.

Figure 1:
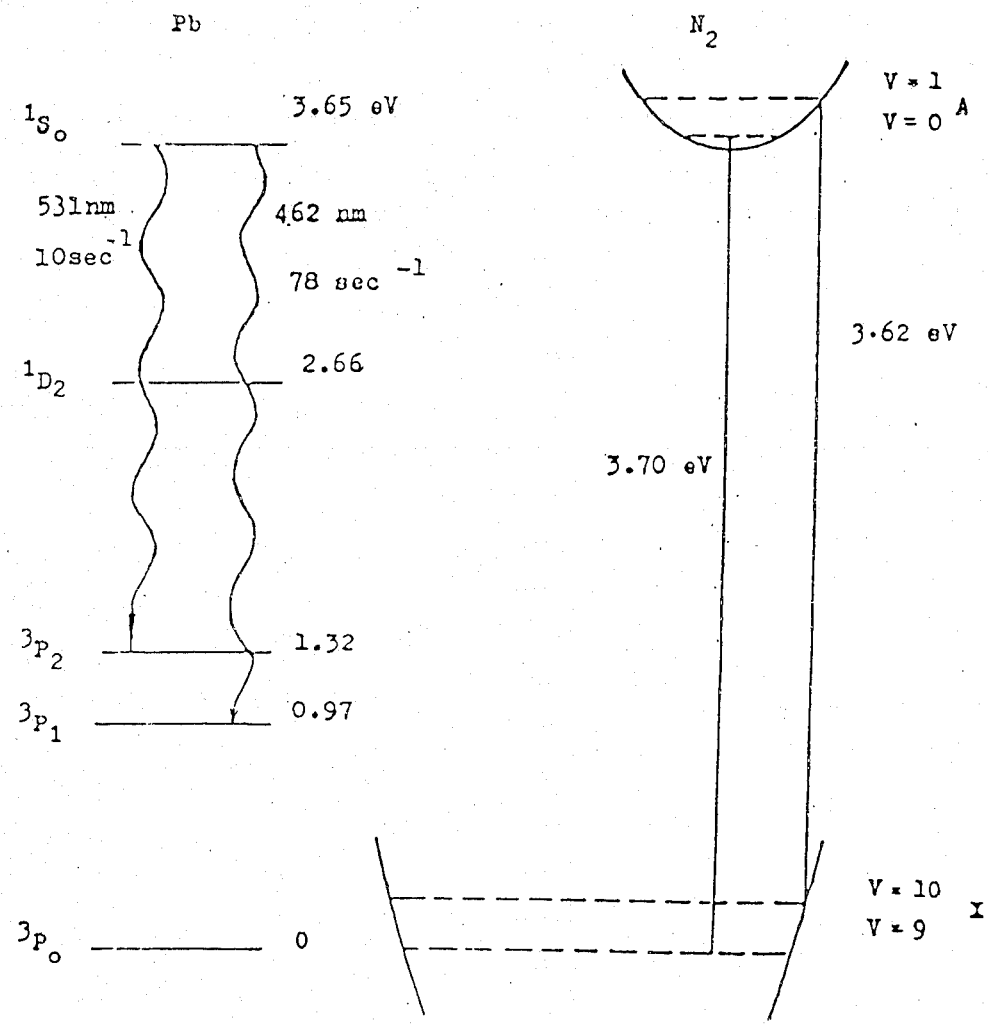
FIG. 1 is an energy level diagram.

FIG. 1 demonstrates that the $^1S_o$ state of Pb is an ideal initial state for a chemical laser in the visible range. It is relative metastable with a radiative lifetime of ∼11 milliseconds so that its population can be built up over a time much shorter than its radiative lifetime; its strongest transitions are to the $^3P_2$ and $^3P_1$ states, resulting in visible emissions.

The $^1S_o \rightarrow ^3P_2$ and $^1S_o \rightarrow ^3P_1$ transitions have very favourable degeneracy factors, 1/5 and ⅓ respectively, significantly reducing the population ratios needed to achieve and maintain lasing.

Decomposition of lead azide liberates permole about 450 kJ of which at least 300 kJ is stored in $N_2(A)$. Over 40 percent of the stored energy, i.e. about 140 kJ is available for the transition $Pb^2\ ^1S_o \rightarrow ^3P_1$. A conservative 20 percent transfer efficiency from $N_2(A)$ to $Pb(^1S_o)$ yields 50 J/gram for lasing at 462 nm. The efficiency for 531 nm is about the same.

Figure 2:
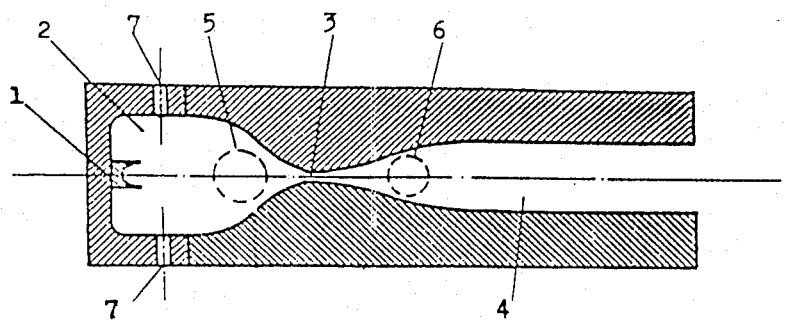
FIG. 2 is a schematical cross-section through a laser of the invention.

In view of the above it is apparent that it is advantageous to expand the gas mixture obtained by the detonation through a supersonic nozzle in, for example slit form along the reaction tube. The gas expands through such slit to the optical resonator tube, the optical axis of which is parallel to the slit and perpendicular to the direction of flow. Other nozzle forms can be used depending upon the requirements for high quality optical media. FIG. 2 demonstrates a scheme of a laser based on the above mentioned principles.

In FIG. 2 a device based on the principles of this invention is illustrated. This laser comprises a container of the source material 1, a reaction cell 2, a nozzle 3 leading to diffuser 4, there being provided mirrors 5 for lasing (light amplification) in the said reaction cell 2, and further mirrors for lasing, 6, in the downstream supersonic region, there being provided ducts 7 to the reaction cell 2.

An example of a cell shown in FIG. 2 has the following dimensions:

The internal dimensions of the reaction cell 2 in FIG. 2 is 20 mm width by 15 mm in the flow direction, by 100 mm in the direction perpendicular to the plane of the Figure. The subsonic laser cavity 2 comprises a 10 mm diameter active region which is 100 mm long in the direction perpendicular to the plane of the Figure. The throat of the nozzle 3 is 20 mm long in the direction of the flow of the gas. Immediately after the throat regions there is located the laser cavity 6 in the supersonic region of the nozzle, of about 10 mm diameter which has a length of about 100 mm in the plane perpendicular to this plane. Typically this lasing region also extends into the region of the diffuser 4. The overall external dimensions of the lasing device are about 30 mm width by 100 mm length in the plane of the Figure and about 100 height perpendicular to the plane of the Figure.

Detonation of lead azide is very fast and can be completed within about one microsecond with proper detonation (flash initiation). At about 10 torr of $N_3{^2}\pi$) and $N_2(A)$, the time constants for their reaction are in the sub microsecond range. Quenching of $Pb(^1S_o)$ by ground state $N_2$ is inefficient, with a time constant of about $10^{-2}$ seconds for 10 torr of $N_2$. Furthermore, quenching of $Pb(^3P_2)$ by $N_2$ is about 200 times faster, and this facilitates lasing on the $^1S_o \rightarrow ^3P_2$ transition.

In a device of FIG. 2, a lasing experiment can be carried out as follows:

A quantity of 50 mg lead azide is irradiated with a 10 ns NdYAG laser pulse, initiating an explosion of the azide. There results a reaction with lasing from allowed transition at 406 and 723 nm from the lead atoms at 5 in FIG. 2, and in lasing from the forbidden transitions at 462 and 531 nm at 6 in FIG. 2.

Explosion of other azides result in lasing at the corresponding wave-lengths of the constituents of the azide components.

It is apparent that there exist a wide range of conditions under which $Pb(^1S_o)$ can be produced in times which are substantially shorter than the life-time of the excited species. By a correct choice of the ratio of quantity of the explosive material to the volume of the reaction tube, an initial pressure can be attained which permits pressure recovery by a diffuser open to the atmosphere, eliminating the need to resort to means for establishing vacuum conditions. If quenching of $Pb(^1S_o)$ by nitrogen limits the initial tube pressure, such pressure can be increased by adding helium which serves as a buffer gas since the quenching of the excited lead species by helium is extremely slow. Should any small particles survive the initial detonation, they will undergo decomposition due to aerodynamic heating during the supersonic expansion.

Amongst other materials suitable for use in lasers of the present invention there may be mentioned copper azide, which results in energy transfer from $N_2(A)$ to an excited copper species. Both $CuN_3$ and $Cu(N_3)_2$ are known. Studies of the kinetics of energy transfer from $N_2(A)$ to Cu have shown the rate constant to be $1.4 \times 10^{-10}$ cm$^3$sec$^{-1}$. The most populated Cu state is the metastable (0.13 msec)$4p'^4P°5/2$ state. Detonation of copper azide followed by expansion through a wide-slit nozzle results in a 359 nm $^4P°_{5/2} \rightarrow ^2D_{5/2}$ laser emission downstream of the slit.

Another suitable material is bismuth azide where an energy transfer from $N_2(A)$ to the $^2D_{3/2}$ state at 4.11 eV results.

Other atoms, preferably metal atoms, and small molecules have energy levels excitable by resonant energy transfer from $N_2(A)$. Amongst these are the azides mentioned above, which can be used as solid-fuel pulsed chemical lasers. Azides or other explosive compounds containing suitable nitrogen moieties where the other atom or atoms of the molecule are not efficient in accepting energy from the $N_2(A)$ can be used for lasing from the $N_2(C \rightarrow B)$ and from the $N_2(B \rightarrow A)$ transitions, resulting from energy pooling of $N_2(A)$. Lasing of these states is possible in the reaction tube proper.

Further materials which may be utilised in chemical lasers of the invention are mixed azides. Furthermore, detonation in a gas or gaseous mixture containing potential lasants such as CO, NO, may be utilised to chemically excite such lasants.

It is one of the pronounced advantages of such azide lasing systems that a large part of the energy of the molecule can be utilised.

It is clear that the above description is by way of example only and that many variations and modifications in the nature of the explosive material, detonation and lasing system may be resorted to without departing from the scope and spirit of this invention.

We claim:

1. A pulsed short-wavelength chemical laser comprising:
   introducing means for introducing an explosive fuel, the detonation of which by flash initiation results in the formation of first electronically excited molecules and the pulsed emission of short-wave light, either indirectly, by energy transfer from said first electronically excited molecules to other molecules or atoms to form second electronically excited molecules or atoms which lase to emit said short-wave light by electronic relation, or directly, said first electronically excited molecules lasing by electronic relaxation;

a detonation chamber for receiving said explosive fuel from said introducing means;

a detonation means for detonating, by flash initiation, explosive fuel in said detonation chamber; and a resonant cavity, in communication with said detonation chamber, for amplifying said pulsed emission of short-wave light resulting from detonation of said explosive fuel in said detonation chamber by said detonation means.

2. A chemical laser according to claim 1, where the resonant cavity has shape of a supersonic nozzle.

3. A laser according to claim 2, where the resonant cavity is followed by an exit chamber for spent gases.

4. A laser according to claim 3, where the exit chamber contains a diffuser for pressure recovery.

5. A laser according to claim 1, where the detonation chamber is inside of said resonant cavity.

6. The laser of claim 1, further comprising said explosive fuel in said detonation chamber.

7. A laser according to claim 6, where the explosive fuel is provided in a predetermined quantity.

8. A laser according to claim 6, where the explosive fuel comprises an azide.

9. A laser according to claim 8, where the azide is lead azide.

10. A system according to claim 8, where the azide is an azide of copper, of an alkali metal, of Mg, Cd, Al, Ag, Hg, Fe, Bi or Mn, or of CO or NO.

11. A method of producing a pulsed laser beam of short-wave light, comprising the steps of:

introducing into a detonation chamber an explosive fuel, the detonation of which by flash initiation results in the formation of first electronically excited molecules and the pulsed emission of short-wave light, either indirectly, by energy transfer from said first electronically excited molecules to other molecules or atoms to form second electronically excited molecules or atoms which lase to emit said short-wave light by electronic relation, or directly, said first electronically excited molecules lasing by electronic relaxation;

detonating, by flash initiation, said explosive fuel in said detonation chamber; and amplifying the pulsed emission of said short-wave light by said detonated explosive fuel in a resonant cavity to produce an amplified pulse laser beam of said short-wave light.

* * * * *